United States Patent
Gao et al.

(10) Patent No.: US 12,151,228 B2
(45) Date of Patent: Nov. 26, 2024

(54) DEVICE AND METHOD FOR PREPARING IN-SITU MOLDED BIOCHAR WITH HIGH SPECIFIC SURFACE AREA

(71) Applicant: DALIAN UNIVERSITY OF TECHNOLOGY, Liaoning (CN)

(72) Inventors: Yuan Gao, Liaoning (CN); Yongfeng Jia, Liaoning (CN); Aimin Li, Liaoning (CN); Shaofeng Wang, Liaoning (CN); Xin Wang, Liaoning (CN)

(73) Assignee: DALIAN UNIVERSITY OF TECHNOLOGY, Liaoning (CN)

( * ) Notice: Subject to any disclaimer, the term of this patent is extended or adjusted under 35 U.S.C. 154(b) by 270 days.

(21) Appl. No.: 17/786,944

(22) PCT Filed: Sep. 18, 2020

(86) PCT No.: PCT/CN2020/116195
§ 371 (c)(1),
(2) Date: Jun. 17, 2022

(87) PCT Pub. No.: WO2022/036799
PCT Pub. Date: Feb. 24, 2022

(65) Prior Publication Data
US 2023/0026850 A1    Jan. 26, 2023

(30) Foreign Application Priority Data
Aug. 18, 2020  (CN) .......................... 202010828456.2

(51) Int. Cl.
*B01J 20/00*    (2006.01)
*B01J 20/20*    (2006.01)
(Continued)

(52) U.S. Cl.
CPC ........... *B01J 20/3078* (2013.01); *B01J 20/20* (2013.01); *B01J 20/3007* (2013.01); *B09C 1/10* (2013.01); *C09K 17/02* (2013.01); *B09C 2101/00* (2013.01)

(58) Field of Classification Search
CPC .............................. B01J 20/3078; B01J 20/20
See application file for complete search history.

(56) References Cited

FOREIGN PATENT DOCUMENTS

| CN | 101730733 A | 6/2010 |
|---|---|---|
| CN | 102260506 A | 11/2011 |

(Continued)

*Primary Examiner* — Nicholas R Krasnow
(74) *Attorney, Agent, or Firm* — MUNCY, GEISSLER, OLDS & LOWE, P.C.

(57) ABSTRACT

A device and method for preparing in-situ molded biochar with high specific surface area. Crushed and mixed biomass and modifier are fed into a hot pressing and pyrolysis device, and hot-pressing molding and pyrolysis carbonization are completed synchronously, which solves the problem of multiple steps and complicated equipment in the existing preparation process for molded biochar material. In-situ bonding molding is realized by adhesion, bridging, cross-linking and mechanical interlocking functions of low-temperature molten & softened lignin and pyrolytic tar. No additional cross-linking agent is needed in this process, so the production cost is low. Covering and suffocating actions of trace flame retardant modifier are utilized to reduce the temperature of biomass pyrolysis carbonization, inhibit excessive ablation and accelerate polycondensation reaction, thus to improve the specific surface area and yield of a product, and improve the cost performance of the product.

4 Claims, 1 Drawing Sheet

(51) Int. Cl.
*B01J 20/30* (2006.01)
*B09C 1/10* (2006.01)
*C09K 17/02* (2006.01)

(56) References Cited

FOREIGN PATENT DOCUMENTS

| CN | 105480974 A | 4/2016 |
| CN | 107142118 A | 9/2017 |
| EP | 3199609 A1 | 8/2017 |
| WO | WO 2009042633 A1 | 4/2009 |

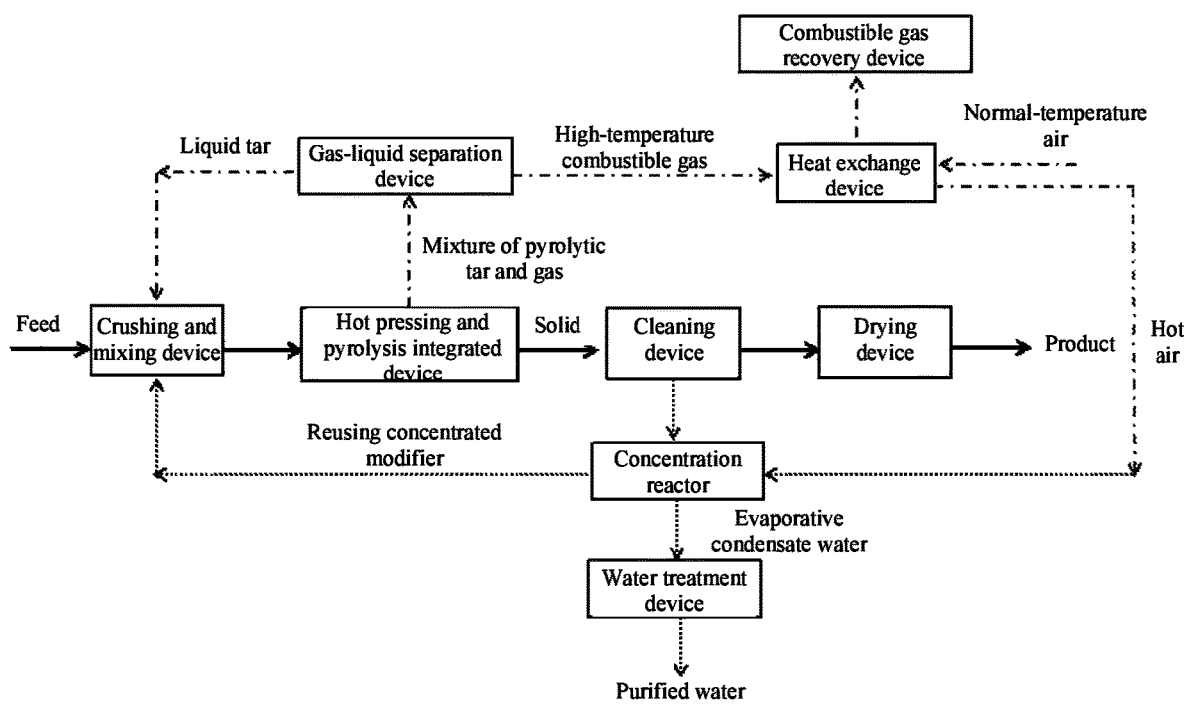

DEVICE AND METHOD FOR PREPARING IN-SITU MOLDED BIOCHAR WITH HIGH SPECIFIC SURFACE AREA

TECHNICAL FIELD

The present invention belongs to the technical field of carbon materials, and provides a device and method for preparing in-situ molded biochar with high specific surface area.

BACKGROUND

In recent years, industrial activities such as mineral resource exploitation, chemical product production and sewage discharge have aggravated soil heavy metal pollution in China. By 2019, the total over limit rate of soil pollution in China had reached 16%, with more than 10 million hectares of polluted farmland. The main heavy metals causing soil pollution include biotoxic elements such as arsenic, cadmium, nickel, lead and copper. Pollutants in soil circulating into human body through ecosphere may cause various diseases. Common soil remediation technologies include physical remediation, chemical passivation, biological remediation and agroecological remediation. Among which, the technology of using cheap biochar material as a passivator and applying the biochar material to polluted soil can not only be used to adsorb heavy metal pollutants and reduce bioavailability thereof, but also improve physical and chemical environment of the soil. Therefore, this technology has attracted much attention.

However, when applied to polluted soil medium, low-density biochar powder is easy to migrate under the scouring action of surface runoff or rain, which results in the expansion of soil pollution range. Therefore, it is necessary to carry out study on high-density and high-strength molded biochar material. At present, two common methods for preparing molded biochar material are used: the first method is to add binder and conduct extrusion forming to biomass raw material first, and then pyrolyze the molded raw material; the second method is to prepare biochar powder first, and then add organic binder (phenolic resin, carboxymethyl cellulose sodium, asphalt, polyvinyl alcohol, etc.) or inorganic binder (bentonite, montmorillonite, kaolinite, diatomite, etc.) and conduct extrusion forming. Both of the two methods have certain limitations: in the first method, the binder is easy to deactivate under the action of high temperature (<500° C.) in the process of carbonization or activation, so that compressive strength and density of final product is decreased, and the final product is easy to be crushed in the process of application; in the second method, pore structures are destroyed, specific surface area is reduced and active adsorption sites are reduced by directly adding binder to biochar. Moreover, both methods require the addition of additional binder, and require the molding and carbonization steps being carried out in two devices.

In addition, when biochar is used in the adsorption process of heavy metals and other pollutants, the content of surface active sites per unit mass (including pores, edge defects, topological defects, surface functional groups, etc.) has direct influence on the cost performance of the material. In the same conditions, the higher the yield and specific surface area are, the lower the relative production cost will be. In addition, control of pyrolysis temperature is also one of the important factors to reduce energy consumption and production cost. Therefore, in the process of material preparation, it is of great significance to study how to realize effective preparation of biochar with low temperature, high specific surface area and high yield.

SUMMARY

In view of the above situation, to overcome the defects in the prior art, the present invention provides a device and technological method for preparing low-temperature, in-situ molding, and high specific surface area biochar.

The technical solution of the present invention is as follows:

A device for preparing in-situ molded biochar with high specific surface area, comprising a crushing and mixing device, a hot pressing and pyrolysis device, a cleaning device, a drying device, a gas-liquid separation device, a heat exchange device, a combustible gas recovery device, a concentration reactor and a water treatment device, wherein the crushing and mixing device, the hot pressing and pyrolysis device, the cleaning device and the drying device are connected in sequence; the hot pressing and pyrolysis device is connected with the gas-liquid separation device, the gas-liquid separation device is connected with the heat exchange device, and the heat exchange device is connected with the combustible gas recovery device; the cleaning device, the concentration reactor and the water treatment device are connected in sequence; the concentration reactor is connected with the heat exchange device, and is also connected with the crushing and mixing device; the crushing and mixing device is connected with the gas-liquid separation device;

A mixture of pyrolytic tar and gas at an outlet of the hot pressing and pyrolysis device is introduced into the gas-liquid separation device, and a solid is introduced into the cleaning device; liquid tar separated by the gas-liquid separation device is introduced into the crushing and mixing device, and high-temperature combustible gas is introduced into the heat exchange device; pyrolytic gas at an outlet of the heat exchange device is introduced into the combustible gas recovery device; hot air of the heat exchange device is introduced into the concentration reactor; washing liquid of the cleaning device is introduced into the concentration reactor, evaporative condensate water at an outlet of the concentration reactor is introduced into a water treatment reactor, and concentrated modifier at the outlet of the concentration reactor is introduced into the crushing and mixing device.

The crushing and mixing device is mainly composed of a cutting tool set, a screening module, an agitator, an atomization module and a conveying system.

The hot pressing and pyrolysis device is mainly composed of a temperature control system, a pressure control system, a forming mold, a pressurizing module and a heating module.

A method for preparing in-situ molded biochar with high specific surface area comprises the following steps:

I Crushing and mixing stage: adding biomass to the crushing and mixing device, starting the crushing and mixing device, using the cutting tool set to crush the biomass into a powder of 100-200 meshes, adding modifier, starting the atomization module, adding water, then using the agitator to fully mix the biomass and the modifier, and conveying the mixture to the hot pressing and pyrolysis device through the conveying system;

II Hot pressing and pyrolysis carbonization stage: after the mixture of step I entering the hot pressing and pyrolysis device, starting the temperature control system and the pressure control system of the hot pressing and pyrolysis device, adjusting the pressure and temperature for hot pressing and pyrolysis carbonization, adopting continuous, stepwise or interactive pressurizing and heating modes in this stage, and obtaining a three-phase product of pyrolytic tar, pyrolytic gas and pyrolytic carbon after heat preservation and pressure maintaining; introducing the mixture of pyrolytic tar and gas into the gas-liquid separation device to separate the liquid tar and the high-temperature combustible gas, circulating the liquid tar to the crushing and mixing device to be mixed with a next batch of biomass, making the high-temperature combustible gas enter the heat exchange device in the form of high-temperature pyrolytic gas, conducting indirect heat exchange between the high-temperature pyrolytic gas and the air in the heat exchange device, introducing hot air after heat exchange into the concentration reactor to provide energy for evaporation of the washing liquid, and introducing the pyrolytic gas after heat exchange into the combustible gas recovery device to be collected;

III Separation and washing stage: cleaning and drying the solid produced by the hot pressing and pyrolysis device in step II by the cleaning device and the drying device to obtain a molded biochar product, passing the washing liquid discharged by the cleaning device through the concentration reactor, providing energy for evaporation and concentration of the washing liquid by the high-temperature hot air, reusing the concentrated modifier in the crushing and mixing device, and making the residual evaporative condensate water enter the water treatment device to be treated and discharged after meeting standards.

The biomass is an industrial by-product, agricultural waste, urban waste, etc. which contains lignin, cellulose and hemicellulose, such as sludge, papermaking black liquid, rice husk, straw, wood scraps, bamboo scraps, leaves and Enteromorpha, and can be one or a mixture of more than one thereof.

The modifier is one or a mixture of more than one of modifiers such as phosphate ester, pyrophosphate, ammonium polyphosphate, phosphoramide and triammonium phosphate; and the mass ratio of the modifier to the biomass is 0.05-5.

The heating mode is resistance heating, electromagnetic coil heating, microwave heating, etc.; and the pressurizing mode can be mechanical drive or hydraulic drive.

The hot pressing and pyrolysis device has a pressurizing strength of 1-200 $MPa/cm^2$, a heating temperature of 300° C.-500° C., a time for synchronous hot pressing and pyrolysis carbonization of 5-120 min, a heating rate of 1° C.-20° C./min, and a pressurizing rate of 1-20 $MPa/cm^2/min$.

The principle of the present invention is as follows: forming mechanism: main components of the biomass include lignin, cellulose and hemicellulose. In the process of low-temperature hot pressing (<300° C.), when temperature is higher than the glass transformation temperature of lignin, amorphous lignin is softened and molten to play a bonding function in the manner of bridging, filling, gomphosis, chemical reunion and mechanical interlocking by intermolecular hydrogen bond and acting forces such as van der Waals force and capillary pressure between particles; In the process of high-temperature carbonization (300° C.-500° C.), a certain amount of viscous substance such as tar, oligosaccharide and polycyclic aromatic hydrocarbons can be produced in situ by biomass pyrolysis. In the process of constant pressurization, a molded material with a certain mechanical strength can be formed by the viscous substance under the actions such as adsorption, diffusion, polycondensation, crosslinking and curing. Pore-forming mechanism: actions such as heat absorption, covering, suffocation and free radical capture of flame retardant modifier are utilized to reduce the temperature for carbonization in the process of biomass pyrolysis, inhibit excessive ablation of biomass, accelerate polycondensation reaction, create more pore structures and improve product porosity.

The present invention has the following beneficial effects:

(1) Biochar molding and pyrolysis are realized simultaneously, which simplifies the process steps, reduces the equipment occupation area, and reduces the production cost.

(2) No binder is required to be added in the process of hot pressing, and no inert protective gas is required in the process of pyrolysis carbonization, which greatly reduces the production cost.

(3) When applied to polluted soil, high-density molded biochar material is favorable for alleviating material migration caused by scouring action of rain, etc. and improving stabilization effect. The production of high specific surface area biochar material can provide more active adsorption sites for the passivation of pollutants such as heavy metals, thus improving the adsorption capacity per unit volume of adsorbent and improving the cost performance of product.

(4) The molded biochar with a certain strength is not only easy to transport, but also less vulnerable to external forces such as mechanical agitation in the actual process of adding, and the molded biochar is also non-fragile and easy to recycle.

DESCRIPTION OF DRAWINGS

The FIGURE is a schematic diagram of a process for preparing in-situ molded biochar with high specific surface area.

DETAILED DESCRIPTION

A specific embodiment of the present invention is further described below in combination with the drawings and the technical solution.

Embodiment

Conveying 100 g of Enteromorpha to the crushing and mixing device, starting the crushing and mixing device, crushing the Enteromorpha into a powder of 200 meshes, adding 200 g of ammonium polyphosphate, starting the atomization module, adding 50 g of atomized water vapor, then using the agitator to fully mix rice husk powder and ammonium polyphosphate, and conveying the mixture to the hot pressing and pyrolysis device. Adjusting the temperature control system and pressure control system, adopting a stepwise heating and pressurizing mode, and setting heating rate to be 10° C./min, final temperature to be 400° C., pressure intensity to be 2 $MPa/cm^2/min$, final pressure to be 80 $MPa/cm^2$, and residence time of final temperature and final pressure to be 60 min. After pyrolysis, relieving pressure slowly, cleaning and drying the solid product to obtain a molded biochar product. Passing the washing liquid through the concentration reactor, reusing the concentrated modifier in the crushing and mixing device to be mixed with a next batch of Enteromorpha powder, and making the evaporative condensate water enter the water treatment device to be treated and discharged after meeting standards. Introducing the mixture of pyrolytic tar and gas into the gas-liquid separation device to separate liquid viscous product and gas product, circulating the liquid viscous product to the crushing and mixing device to be mixed with a next batch of Enteromorpha powder, making the gas product enter the heat exchange device in the form of high-temperature pyrolytic gas, conducting indirect heat exchange between the high-temperature pyrolytic gas and the air in the heat exchange device, introducing hot air after heat exchange into the concentration reactor to provide energy for evaporation of the washing liquid, and collecting the pyrolytic gas after heat exchange for later use.

It should be understood that the purpose of the disclosure of the embodiment is to explain, rather than limiting the present invention, and all technical solutions derived from simple replacement, combination and evolution based on the present invention shall be fallen into the protection scope of the present invention.

The invention claimed is:

1. A method for preparing in-situ molded biochar with high specific surface area, comprising the following steps:
   step (I) crushing and mixing stage: crushing biomass into a powder of 100-200 meshes, adding a modifier, adding water, then using an agitator to fully mix the biomass and the modifier, and conveying the mixture to a hot pressing and pyrolysis device through a conveying system;
   wherein the modifier is one or a mixture of more than one of phosphate ester, pyrophosphate, ammonium polyphosphate, phosphoramide and triammonium phosphate; and a mass ratio of the modifier to the biomass is 0.05-5;
   step (II) hot pressing and pyrolysis carbonization stage: after the mixture of the step (I) entering the hot pressing and pyrolysis device, starting a temperature control system and a pressure control system of the hot pressing and pyrolysis device, adjusting pressure and temperature for hot pressing and pyrolysis carbonization, adopting continuous, stepwise or interactive pressurizing mode and heating mode in this stage, and obtaining a three-phase product of pyrolytic tar, pyrolytic gas and pyrolytic carbon after heat preservation and pressure maintaining; separating a liquid tar and a high-temperature combustible gas in the mixture of pyrolytic tar and pyrolytic gas, circulating the liquid tar to the crushing and mixing device to be mixed with a next batch of biomass, conducting indirect heat exchange between the high-temperature pyrolytic combustible gas and air, providing energy from hot air after heat exchange for evaporation of washing liquid, and collecting the pyrolytic gas after heat exchange;
   step (III) separation and washing stage: cleaning and drying solid produced by the hot pressing and pyrolysis device in the step (II) to obtain a formed biochar product, providing energy for evaporation and concentration of the washing liquid by the high-temperature hot air, reusing the concentrated modifier in the crushing and mixing device, and treating and discharging the residual evaporative condensate water after meeting standards.

2. The method for preparing in-situ molded biochar with high specific surface area according to claim 1, wherein the hot pressing and pyrolysis device is mainly composed of a temperature control system, a pressure control system, a forming mold, a pressurizing module and a heating module.

3. The method for preparing in-situ molded biochar with high specific surface area according to claim 1, wherein the biomass is one or a mixture of more than one of an industrial by-product, agricultural waste and urban waste which contains lignin, cellulose and hemicellulose.

4. The method for preparing in-situ molded biochar with high specific surface area according to claim 1, wherein the heating mode is resistance heating, electromagnetic coil heating or microwave heating; and the pressurizing mode is mechanical drive or hydraulic drive.

* * * * *